United States Patent
Wu et al.

(10) Patent No.: US 9,953,497 B2
(45) Date of Patent: Apr. 24, 2018

(54) MERCHANDISE SECURITY SYSTEM WITH DATA COLLECTION FEATURES AND RELEVANT TECHNICAL FIELD

(71) Applicant: QUASION INC., Ancaster, Ontario (CA)

(72) Inventors: Xiaohua Wu, Beijing (CN); Ziyue Ouyang, Beijing (CN)

(73) Assignee: QUASION INC., Ancaster (CA)

( * ) Notice: Subject to any disclaimer, the term of this patent is extended or adjusted under 35 U.S.C. 154(b) by 43 days.

(21) Appl. No.: 15/107,182

(22) PCT Filed: Dec. 24, 2013

(86) PCT No.: PCT/CN2013/090314
§ 371 (c)(1),
(2) Date: Jun. 22, 2016

(87) PCT Pub. No.: WO2015/096026
PCT Pub. Date: Jul. 2, 2015

(65) Prior Publication Data
US 2017/0004687 A1  Jan. 5, 2017

(51) Int. Cl.
*G08B 13/14* (2006.01)
*H04L 29/06* (2006.01)
(Continued)

(52) U.S. Cl.
CPC ..... *G08B 13/1445* (2013.01); *G07C 9/00309* (2013.01); *G08B 13/1409* (2013.01); *H04L 63/0428* (2013.01); *H04W 4/80* (2018.02)

(58) Field of Classification Search
None
See application file for complete search history.

(56) References Cited

U.S. PATENT DOCUMENTS 5,164,718 A * 11/1992 Cedergren ......... G07C 9/00142
109/2
5,473,236 A * 12/1995 Frolov ................ E05B 47/0012
318/265

(Continued)

FOREIGN PATENT DOCUMENTS

| CN | 101059904 A | 10/2007 |
| CN | 102624988 A | 8/2012 |
| CN | 103353969 A | 10/2013 |

OTHER PUBLICATIONS

"International Application No. PCT/CN2013/090314, International Search Report dated Sep. 30, 2014", w/ English Translation, 5 pgs.

(Continued)

*Primary Examiner* — Quan-Zhen Wang
*Assistant Examiner* — Chico A Foxx
(74) *Attorney, Agent, or Firm* — Schwegman Lundberg & Woessner, P.A.

(57) ABSTRACT

A merchandise security system with data collection features and a relevant method are disclosed. The system has: a data management unit, at least one alarm unit and at least one alarm disabling unit, wherein the data management unit is configured to synchronize unlocking data in the alarm disabling unit and set unlocking judgment data in the alarm unit; the alarm unit can detect, in an alarm enabled state, whether a merchandise to be protected is in a normal state, and send out an alarm signal when judging that the merchandise to be protected is not in a normal state; and the alarm unit judges, according to the unlocking judgment data stored therein, whether the unlocking data is legitimate, and disable the alarm enabled state when judging that the unlocking data is legitimate. In the present disclosure, each of the unlocking judgment data corresponds to unique legitimate unlocking data embedded in the alarm disabling unit. The alarm unit can realize a data collection function, (Continued)

and can not only collect information related to enabling an alarm and disabling the alarm, but also can collect other data related to user behaviors for later data analysis.

17 Claims, 6 Drawing Sheets

(51) Int. Cl.
*H04W 4/00* (2018.01)
*G07C 9/00* (2006.01)

(56) References Cited

U.S. PATENT DOCUMENTS

| | | | | |
|---|---|---|---|---|
| 5,923,264 | A * | 7/1999 | Lavelle | G07C 9/00015 235/375 |
| 7,994,914 | B2 * | 8/2011 | Irmscher | A47F 7/024 340/531 |
| 8,872,660 | B2 * | 10/2014 | Yunker | H03K 17/962 248/187.1 |
| 2002/0188675 | A1 * | 12/2002 | Nakajima | G06Q 20/04 709/203 |
| 2006/0208069 | A1 * | 9/2006 | Gilbert | B60R 25/24 235/382.5 |
| 2006/0214766 | A1 * | 9/2006 | Ghabra | G07C 9/00309 340/5.25 |
| 2006/0271545 | A1 * | 11/2006 | Youn | G06F 17/30864 |
| 2008/0012684 | A1 * | 1/2008 | Fawcett | G07C 9/00309 340/5.25 |
| 2008/0022061 | A1 * | 1/2008 | Ito | G11B 20/00086 711/162 |
| 2009/0243837 | A1 * | 10/2009 | Chul Lee | G08B 25/008 340/531 |
| 2009/0322510 | A1 * | 12/2009 | Berger | G06Q 10/08 340/539.1 |
| 2011/0254661 | A1 * | 10/2011 | Fawcett | G08B 13/1445 340/5.61 |
| 2012/0086314 | A1 * | 4/2012 | Bourke | G07F 17/10 312/109 |
| 2012/0293330 | A1 * | 11/2012 | Grant | G08B 13/1427 340/568.8 |
| 2013/0033380 | A1 * | 2/2013 | Fawcett | G08B 13/1436 340/568.1 |
| 2013/0081434 | A1 * | 4/2013 | Grant | E05B 47/026 70/1.5 |
| 2013/0268316 | A1 * | 10/2013 | Moock | G06Q 30/0201 705/7.29 |
| 2013/0307668 | A1 * | 11/2013 | Grant | G07C 9/00857 340/5.25 |
| 2014/0159900 | A1 * | 6/2014 | Joseph | G08B 13/2417 340/572.1 |
| 2014/0340225 | A1 * | 11/2014 | Grant | G08B 13/1445 340/568.2 |
| 2015/0091729 | A1 * | 4/2015 | Phillips | G08B 13/1427 340/568.2 |

OTHER PUBLICATIONS

"International Application No. PCT/CN2013/090314, International Written Opinion dated Sep. 30, 2014", in English, 15 pgs.

* cited by examiner

MERCHANDISE SECURITY SYSTEM WITH DATA COLLECTION FEATURES AND RELEVANT TECHNICAL FIELD

PRIORITY APPLICATIONS

This application is a U.S. National Stage Filing under 35 U.S.C. 371 from International Application No. PCT/CN2013/090314, filed on 24 Dec. 2013, and published as WO 2015/096026 on 2 Jul. 2015; which application and publication are incorporated herein by reference in its entirety.

The present disclosure relates to a merchandise security system with data collection features and the relevant methods, which belong to the field of anti-theft technology.

BACKGROUND

In public service facilities such as retail stores, exhibition halls, hotels, banks or the likes, in order to prevent open displayed merchandises and service installations from being stolen, an open display merchandise security device may be used to protect open displayed merchandises and service installations. For example, for retail stores or exhibition floor electronic devices such as mobile phones, digital cameras, tablet computers or the like may be open displayed, these devices may generally be electronically connected to open display merchandise security device on a display counter. When a customer wants to operate an electronic device to learn its functions, he/she may directly operate the electronic device, but cannot disconnect the electronic device from the open display merchandise security device. If the electronic device is forcibly disconnected, an alarm of the security system will be triggered.

The current open display merchandise security device has two kinds of working states, which are a locked state and an unlocked state. After the open display merchandise security device is electronically connected to an electronic device, it may be set to be in a locked state. In this case, if the electronic device is disconnected, the open display merchandise security device may trigger an alarm. When the open display merchandise security device is in an unlocked state, it will not trigger an alarm, no matter whether it is connected to the electronic device or not. Switching between the locked state and the unlocked state may be implemented by directly operating the open display merchandise security device, or may also be implemented by using a dedicated unlocking device, for example, an electronic key, to lock and unlock the open display merchandise security device.

Thus, the current open display merchandise security devices have the following disadvantages.

1. The current open display merchandise security device only stores one set of decoding data (encrypted data for disabling an alarm). Therefore, in the same place, keys (alarm disabling apparatuses) for all of the open display merchandise security devices are the same. After an action of using a key to unlock (disable an alarm) for stealing occurs, it is unable to verify a responsible person, let alone collecting a history record of unlocking and locking (enabling an alarm and disabling an alarm) operations of different operators.

2. For the current open display merchandise security system merchandise security system, a key can unlock all of locked security systems in a place, which fails to meet the security requirements of the valuable merchandise or special merchandise.

3. The current merchandise security systems do not have a data collection function, for example, data record of an alarm locked and unlocked history, which is beneficial for verification after a theft case occurs. Furthermore, the current merchandise security systems do not have a function of collecting user data for interaction with open display merchandises, which is beneficial to manage the sales and store operation in customized fashion

SUMMARY (1) Technical Problem to be Solved

One technical problem to be solved by the present disclosure is that the current open display merchandise security system for a merchandise can only be unlocked by the same unlocking device using the same decoding data, which results in poor anti-theft performance and poor store management.

Another technical problem to be solved by the present disclosure is that the current open display merchandise security system cannot monitor and collect use status information.

(2) Technical Solutions

In order to solve at least one technical problem described above, the present disclosure proposes a merchandise security system, comprising a data management unit, at least one alarm unit and at least one alarm disabling unit, wherein, the data management unit is configured to synchronize unlocking data in the alarm disabling unit and synchronize unlocking judgment data in the alarm unit; the alarm unit detect, in an alarm enabled state, whether a merchandise to be protected is in a normal state, and send out an alarm signal when detecting that the merchandise to be protected is not in a normal state; and the alarm unit judges, according to the unlocking judgment data stored therein, whether the unlocking data is legitimate, and disable the alarm enabled state when judging that the unlocking data is legitimate, wherein, each of the unlocking judgment data corresponds to unique legitimate unlocking data.

According to a specific embodiment of the present disclosure, each alarm unit has one or more unlocking judgment data stored therein, and each alarm disabling unit only has one unlocking data embedded therein; and when the unlocking data embedded in the alarm disabling unit is legitimate unlocking data for any of the unlocking judgment data in the alarm unit, the alarm disabling unit can disable the alarm enabled state of the alarm unit.

According to a specific embodiment of the present disclosure, the same unlocking data as the unlocking judgment data is the legitimate unlocking data.

According to a specific embodiment of the present disclosure, the unlocking judgment data is an encrypted data which is encrypted using a particular encryption algorithm, and the unlocking data is a key for decrypting the encrypted data.

According to a specific embodiment of the present disclosure, the data management unit is further configured to enable the alarm unit from the alarm disabled state to the alarm enabled state.

According to a specific embodiment of the present disclosure, the alarm unit is further configured to acquire and store working status history data, and the data management unit may further be configured to collect record of the working status history data from the alarm unit, wherein the working status history data is recording information of changes of a working history of the alarm unit.

According to a specific embodiment of the present disclosure, the working status history data comprises time for enabling the alarm locked state, an identity of the data management unit implementing the enabling operation, time for disabling the alarm unlocked state, and an identity of the alarm disabling unit implementing the unlocking operation.

According to a specific embodiment of the present disclosure, the alarm unit is further configured to acquire and store merchandise history data and/or user interaction data of the merchandise to be protected, and the data management unit is further configured to acquire the merchandise history data and/or user interaction data of the merchandise to be protected from the alarm unit, wherein the security system history data is recording information of changes of a working history of the alarm unit and its protected merchandise as well as the user interaction data which is data of interaction behaviors of users with the merchandise to be protected and other user information.

According to a specific embodiment of the present disclosure, the state of the merchandise comprises a "normal state" in which the merchandise is protected and an "abnormal state" in which the merchandise is unprotected as well as other detectable states belonging to the "normal state".

According to a specific embodiment of the present disclosure, the alarm unit comprises a sensor module, a data communication module, an alarm processing module, a main control module; and a storage module, wherein, the sensor module is configured to monitor a state of the merchandise to be protected, and transmit a state change signal to the main control module when it senses that the state of the merchandise or product to be protected changes; the main control module is configured to control a working state of the alarm unit, and judge, in the alarm enabled state, whether the merchandise is in an abnormal state according to the state change signal, and transmits an alarm signal to the alarm processing module when it judges that the merchandise to be protected is in an "abnormal state"; the alarm processing module is configured to implement an alarm process when receiving the alarm signal transmitted by the main control module; the data communication module is configured to establish a data communication channel with the alarm disabling unit or the data management unit, to receive data transmitted by the alarm disabling unit or the data management unit; and the storage module is configured to store the unlocking judgment data.

According to a specific embodiment of the present disclosure; the main control module is further configured to transmit the state change signal to the alarm processing module; and the alarm processing module is further configured to process the state change signal to generate merchandise state history data and/or user interaction data, and store the generated merchandise state history data and/or user interaction data into the storage module.

According to a specific embodiment of the present disclosure; the sensor module is further configured to monitor other detectable states of the merchandise to be protected belonging to the "normal state", and transmit a state change signal to the main control module when a detected state belonging to the "normal state" changes; the main control module is further configured to transmit the state change signal to the alarm processing unit; and the alarm processing unit is further configured to process the state change signal to generate the merchandise state history data and/or user interaction data, and store the generated merchandise state history data and/or user interaction data into the storage module.

According to a specific embodiment of the present disclosure; the storage module is further configured to store the working state history data, wherein the working state history data is history information of changes in a working state of the alarm unit; and the main control module is further configured to write the working state data into the storage module when the working state changes.

According to a specific embodiment of the present disclosure; the working state history data further comprises data related to failures in changing the working state.

The present disclosure further proposes a method for writing unlocking judgment data in the alarm unit of the merchandise security system described above, comprising steps of:

S11: the data management unit establishing a connection with the data communication module of the alarm unit;

S12: judging whether the data management unit matches with the alarm unit;

S13: if it is judged that the data management unit matches with the alarm unit in step S12, the data management unit generating unlocking judgment data and transmitting the unlocking judgment data to the main control unit of the alarm unit through the data communication module; and if it is judged that the data management unit does not match with the alarm unit in step S12, returning error information; and S14: the main control module of the alarm unit writing the unlocking judgment data from the data communication module in the storage module.

The present disclosure further proposes a method for disabling the alarm enabled state in the alarm unit of the merchandise security system described above, comprising steps of:

S21: the alarm disabling unit establishing a connection with the data communication module of the alarm unit;

S22: the alarm unit acquiring the unlocking data embedded in the alarm disabling unit through the data communication module;

S23: the main control module of the alarm unit judging whether the unlocking data is legitimate according to the unlocking data and the unlocking judgment data stored in the storage module of the alarm unit; and S24: if it is judged that the unlocking data is legitimate in step 23, the main control module setting the working state stored in a working state storage module in the main control module as data representing the alarm enabled state; otherwise, not performing any operation.

The present disclosure further proposes a method for extracting the state history data from the anti-theft system described above, wherein the state history data comprises working state history data, merchandise state history data and/or user interaction data, the method comprising steps of:

S31: the data management unit establishing a connection with the data communication module of the alarm unit;

S32: judging whether the data management unit is a legitimate management unit for the alarm unit;

S33: if it is judged that the data management unit is a legitimate management unit for the alarm unit in S32, the data management unit requesting the state history data from the alarm unit through the data communication module; otherwise, stopping operations and returning error information; and S34: the main control module of the alarm unit reading the state history data from the storage module, and transmitting the state history data to the data management unit through the data communication module.

(3) Beneficial Effects

The present disclosure firstly achieves a function of unlocking different alarm apparatuses or the same alarm apparatus using different keys. For example, the same alarm apparatus can be unlocked by different keys and all unlocking related information can be recorded for later verification. Further, a device with particular requirements can be allocated with a key with a higher encryption level to improve the security level.

Further, the merchandise security system according to the present disclosure can achieve a data collection function, and can not only collect information related to enabling an alarm and disabling the alarm, but also can collect other data related to user behaviors for later data analysis and management of the device and usage thereof.

DETAILED DESCRIPTION

In order to make the purpose, technical solutions and advantages of the present disclosure more clear and apparent, specific embodiments of the present disclosure will be further described below in conjunction with accompanying drawings.

Figure 1:
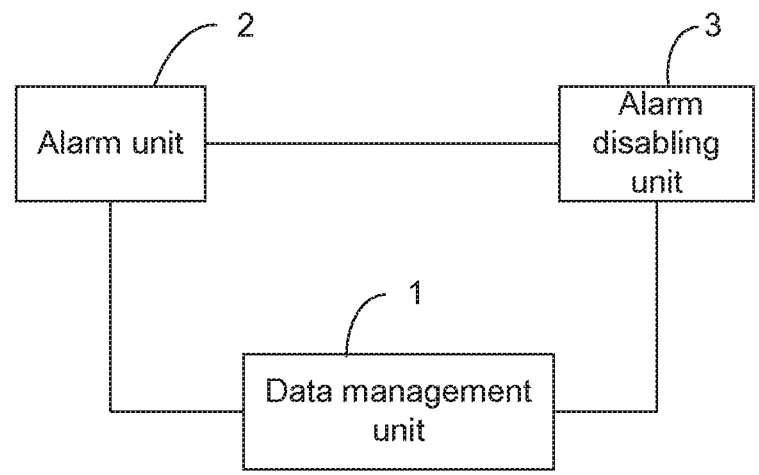
FIG. 1 is a diagram of architecture of a merchandise security system according to the present disclosure.

FIG. 1 is a diagram of architecture of a data collection merchandise security system according to the present disclosure. As shown in FIG. 1, the system comprises a data management unit 1, at least one alarm unit 2 and at least one alarm disabling unit 3. FIG. 1 illustrates an example in which a data management unit 1, an alarm unit 2 and an alarm disabling unit 3 are comprised. When there is more than one alarm unit 2 or alarm disabling unit 3, a connection relationship is similar to that in FIG. 1, except that different alarm units or different alarm disabling units are connected to the same data management unit 1.

The alarm unit 2 has two working states which can be switched with each other, i.e., an alarm enabled state (standby state) and an alarm disabled state. When the alarm unit 2 is in an alarm enabled state, the alarm unit 2 may detect whether a merchandise to be protected is in a normal state, and may send out an alarm signal when it is detected that the merchandise to be protected is not in a normal state. Thereby, the present disclosure can play a role of preventing the merchandise o be protected from being theft.

In the present disclosure, the so-called "normal state" means that the merchandise to be protected is in a protected state, for example, the merchandise is in a particular connection position, or is within a particular region, or is not illegally operated or the like. It should be illustrated that the "normal state" in the present disclosure may be set by a user in a practical specific application environment, which is not particularly limited in the present disclosure.

As shown in FIG. 1, the alarm disabling unit 3 may establish a data communication channel with the alarm unit 2. According to the present disclosure, the alarm disabling unit 3 embeds unlocking data for disabling the alarm enabled state of the alarm unit 2, and the alarm unit 2 stores unlocking judgment data for judging whether the unlocking data is legitimate. When it is judged that the unlocking data is legitimate according to the unlocking judgment data, the alarm disabling unit 3 may recover the alarm unit 2 from the alarm enabled state to an alarm disabled state. The alarm unit 3 in the alarm disabled state does not take any action when a state of the merchandise to be protected changes.

According to the present disclosure, each of the unlocking judgment data corresponds to unique legitimate unlocking data. Further, each alarm unit may store one or more unlocking judgment data and each alarm disabling unit only embeds one unlocking data. When the unlocking data of the alarm disabling unit is legitimate unlocking data for any unlocking judgment data, the alarm disabling unit 3 may disable the alarm enabled state of the alarm unit 2 and recover the alarm unit 2 to an alarm disabled state. Thereby, the alarm enabled state of the alarm unit 2 having particular unlocking judgment data stored therein can only be disabled by the alarm disabling unit 3 having particular unlocking data embedded therein. For example, the same unlocking data as the unlocking judgment data is legitimate unlocking data. If the unlocking data stored in the alarm disabling unit 3 and the unlocking judgment data stored in the alarm unit 2 are encrypted unlocking codes (encrypted codes), only the alarm disabling unit 3 having a particular unlocking code embedded therein which is the same as the unlocking code stored in the alarm unit can disable the alarm enabled state of the alarm unit 2, thereby improving the security of the system. In addition, preferably, an alarm enabled state of each alarm unit 2 can only be disabled by a unique unlocking code, and different alarm units have different unlocking codes, thereby further improving the security of the system. A specific method for unlocking the alarm unit 2 will be described in detail below.

As shown in FIG. 1, the data management unit 1 may establish a data communication connection channel with the alarm unit 2 and the alarm disabling unit 3 respectively. The data management unit 1 is configured to synchronize unlocking data for disabling the alarm enabled state of the alarm unit 2 in the alarm disabling unit 3 and set unlocking judgment data for judging whether the unlocking data is legitimate in the alarm unit 2. For example, the unlocking data embedded in the alarm disabling unit 3 is an encrypted unlocking code, and only the alarm disabling unit 3 having a particular unlocking code embedded therein can disable the alarm enabled state of the alarm unit 2. Preferably, an alarm enabled state of each alarm unit 2 can only be disabled by a unique unlocking code, and different alarm units have different unlocking codes.

The data management unit 1 is further configured to enable the alarm unit 2 from the alarm disabled state to the alarm enabled state.

According to a preferable embodiment of the present disclosure; the alarm unit 2 is further configured to acquire and store working state history data, and the data management unit 1 is further configured to read the working state history data from the alarm unit 2. The working state history data is history information of changes in a working state of the alarm unit 2. For example, when the alarm unit 2 is enabled by the data management unit 1 from the alarm disabled state to the alarm enabled state, the working state history data comprises time for enabling the alarm disabled state; an identity of the data management unit 1 implementing the enabling operation or the like; and when the alarm unit 2 is unlocked by the alarm disabling unit 3 from the alarm enabled state to the alarm disabled state, the working state history data comprises time for disabling the alarm enabled state; and an identity of the alarm disabling unit 3 implementing the unlocking operation or the like.

According to a preferable embodiment of the present disclosure, the alarm unit 2 is further configured to acquire and store merchandise state history data and/or user interaction data of the merchandise to be protected, and the data management unit 1 is further configured to read the merchandise state history data and/or user interaction data from the alarm unit 2. The merchandise state history data is information of changes in a state of a merchandise to be protected. The state of the merchandise comprises a "normal state" in which the merchandise is protected and an "abnormal state" in which the merchandise is unprotected as well as other detectable states belonging to the "normal state". For example, when the merchandise to be protected is a mobile phone, the mobile phone is not only connected to a protection base (alarm unit) via an alarm line, but also is placed on the protection base through a mechanical switch. When a user picks up the mobile phone from the protection base or puts down the mobile phone on the protection base, a state of a positional relationship between the mobile phone and the protection base may change. In this case, although the mobile phone is in a normal protected state as the mobile phone is still connected via the alarm line, changes in the state of the mobile phone relative to the protection base from "separation" to "placement" or from "placement" to "separation" may also be used as the merchandise state history data. The user interaction data comprises interaction behaviors of a user with an merchandise to be protected and characteristic information of the user per se. For example, when the merchandise to be protected is a camera, the camera is not only connected to a protection base (alarm unit) via an alarm line, but also can have a sensor arranged on a key thereof, so as to not only record interaction behaviors of a user with the camera, but also record characteristic information of the user at that time by using a webcam, for example, gender, age or the like of the user.

Figure 2:
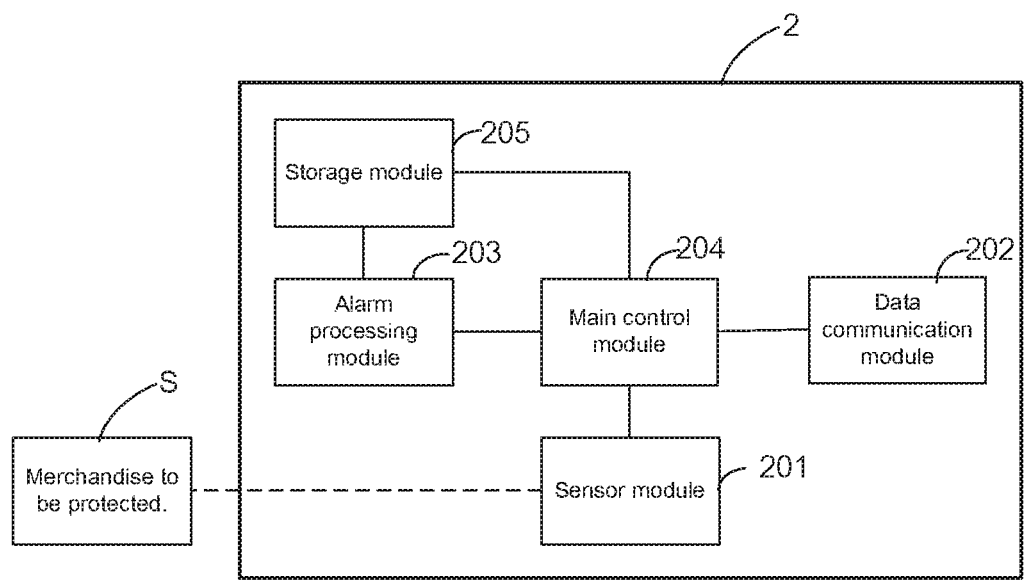
FIG. 2 is a structural diagram of an alarm unit according to the present disclosure.

FIG. 2 is a structural diagram of an alarm unit according to the present disclosure. In the alarm unit 2 illustrated in FIG. 2, the alarm unit 2 comprises a sensor module 201, a data communication module 202, an alarm processing module 203, a main control module 204 and a storage module 205.

The main control module 204 is a core unit of the alarm unit, and is configured to control a working state of the alarm unit 2. The main control module 204 has a working state storage module configured to store working state data of the alarm unit 2. The working state data indicates whether the alarm unit 2 is in an alarm enabled state or an alarm disabled state (standby state). The storage module may be a state register which stores binary data. For example, when the data bit is "1", it indicates that the alarm unit is in an alarm enabled state, and when the binary data bit stored by the storage module is "0", it indicates that the alarm unit is in an alarm disabled state. The working state storage module may also be implemented by other non-volatile memories. The main control module 204 may be implemented by a microprocessor including a state memory. However, the present disclosure does not exclude implementations of other devices having a digital processing function. For example, the main control module 204 may also be a Field Programmable Gate Array (FGPA), a Digital Signal Processor (DSP) or the like.

The sensor module 201 is configured to monitor a state of an merchandise to be protected, and when it is monitored that the state of the merchandise to be protected changes, transmit a state change signal to the main control module 204. The main control module 204 judges whether the merchandise is in an abnormal state according to the state change signal, and when it is judged that the merchandise to be protected is in an "abnormal state", transmit an alarm signal to the alarm processing module 203. The sensor module 201 may be implemented by various sensors, including a mechanical switch, a Micro Electro Mechanical Systems (MEMS) sensor, a Hall switch, a proximity sensor, a camera sensor or the like.

The alarm processing module 203 is configured to implement an alarm process when receiving the alarm signal transmitted by the main control module 204. For example, when the alarm processing module 203 per se has an alarm device such as an alarm light or an alarm buzzer, the alarm processing 203 instructs the alarm light to flicker or instructs the alarm buzzer to give an alarm sound. When the alarm processing module does not include an alarm device, an external alarm device may be enabled. The alarm processing module 203 may be implemented by an independent data processing apparatus such as a microprocessor, or may also be implemented by sharing a data processing apparatus with the main control module 204.

According to an embodiment of the present disclosure, the main control module 204 further transmits the state change signal to the alarm processing module 203, and the alarm processing module 203 is further configured to process the state change signal to generate merchandise state history data and/or user interaction data, and store the generated merchandise state history data and/or user interaction data into the storage module 205. In this embodiment, the main control module 204 is further configured to transmit the stored merchandise state history data and/or user interaction data to the data management unit 1. The merchandise state history data comprises time, duration or the like in which the merchandise is in a normal state or an abnormal state.

According to another embodiment of the present disclosure, the sensor module 201 is further configured to monitor other detectable subdivided states of the merchandise to be protected belonging to the "normal state", and when a detected subdivided state belonging to the "normal state" changes, transmit a subdivided state change signal to the main control module 204. The main control module 204 also transmits the subdivided state change signal to the alarm processing unit 203, and the alarm processing unit 203 also processes the subdivided state change signal, and stores the subdivided state change signal into the storage module 205 as the merchandise state history data and/or user interaction data. In this case, the merchandise state history data not only comprises time, duration or the like in which the merchandise is in a normal state or an abnormal state, but also comprises time, duration or the like in which the merchandise is in a subdivided state belonging to the normal state. The user interaction data comprises interaction behaviors of a user with an merchandise to be protected and characteristic information of the user per se. For example, when the sensor module 201 is a mechanical switch which is in contact with the merchandise to be protected, the sensor module 201 can only monitor whether the merchandise is in a normal state, but cannot monitor a subdivided state belonging to the normal state. The normal state of the merchandise to be protected may be set as a state in which the merchandise to be protected is in contact with a mechanical switch. In this case, when the mechanical switch detects that it is not in contact with the merchandise to be protected, the mechanical switch transmits a state change signal indicating "not being in contact with the merchandise to be protected" to the main control module 204. At this time or when state data stored by the working state storage module of the main control module 204 indicates that the alarm unit 2 is in an alarm enabled state, the main control module 204 transmits an alarm signal to the alarm processing module 203. When the sensor module 201 is a Hall switch, an MEMS sensor, a proximity sensor or a camera sensor which can detect that the merchandise to be protected is in a certain specified region, the sensor module 201 may transmit an acquired position signal representing a position of the merchandise to the main control module 204. The main control module 204 judges whether the merchandise is in the specified region according to the position signal, and when it is judged that the merchandise is not in the specified region, the main control module 204 transmits an alarm signal to the alarm processing module 203. At the same time, the alarm processing module 203 may also process the position signal and then store the position signal into the storage module 205.

When the state data stored by the working state storage module of the main control module 204 indicates that the alarm unit 2 is in an alarm disabled state, the main control module 204 does not process the data from the sensor module 201.

The data communication module 202 is configured to establish a data communication connection channel with the alarm disabling unit 3 or the data management unit 1, to receive data transmitted by the alarm disabling unit 3 or the data management unit 1. Data communication manners comprise wired manners or wireless manners, wherein the wireless manners comprise Near Field Communication (NFC) technology, BlueTooth (BT), Wireless Fidelity (WIFI) communication technology, the $3^{rd}$ Generation (3G) mobile communication technology, Frequency Modulation (FM) communication technology. The present disclosure is not limited to the above specific data communication manners.

When the alarm unit 2 is in an alarm enabled state and establishes a data connection with the alarm disabling unit 3 through the data communication module 202, the main control module 204 is further configured to judge, according to the unlocking data from the alarm disabling unit 3, whether to modify alarm state data representing an "alarm enabled state" stored in the working state storage module of the main control module 204 to working state data representing an "alarm disabled state".

The storage module 205 is configured to store the unlocking judgment data. The main control module 204 judges whether the unlocking data from the alarm disabling unit 2 is legitimate according to the unlocking judgment data, and only when it is judged that the unlocking data is legitimate, the main control module 204 modifies the working state data representing an "alarm enabled state" stored in the working state storage module thereof to working state data representing an "alarm disabled state".

When the alarm unit 2 is in an alarm disabled state and establishes a data connection with the data management unit 1 through the data communication module 202, the main control module 204 is further configured to write the unlocking judgment data from the data management unit 1 into the alarm unit 2.

In an embodiment, both the unlocking data and the unlocking judgment data are unlocking codes, and the unlocking codes in the alarm unit 2 and the alarm disabling unit 3 are synchronize by the data management unit 1. When the alarm unit 2 is in an alarm enabled state and establishes a data connection with the alarm disabling unit 3 through the data communication module 202, the data communication module 202 receives an unlocking code from the alarm disabling unit 3, and the main control module 204 judges whether the received unlocking code is consistent with the unlocking code stored in the storage module 205. When it is judged that the received unlocking code is consistent with the unlocking code stored in the storage module 205, the main control module 204 modifies the working state data representing an "alarm enabled state" stored in the working state storage module thereof to working state data representing an "alarm disabled state". However, the unlocking data and the unlocking judgment data of the present disclosure may also of other data types. For example, the unlocking judgment data is encrypted data which is encrypted by using a particular encryption algorithm, and the unlocking data is a key for decrypting the encrypted data. Only when the key embedded in the alarm disabling unit 3 is the same as the key for decrypting the encrypted data stored in the storage module 205 of the alarm unit 2, the main control module 204 modifies the working state data representing an "alarm enabled state" stored in the working state storage module thereof to working state data representing an "alarm disabled state". The storage module 205 may be implemented by any memory having read and write functions, for example, an NAND flash memory, various memory cards such as a mini-SD/T-Flash/RS-MMC or the like.

According to an embodiment of the present disclosure, the storage module 205 is further configured to store the working state history data. The working state history data is history information of changes in a working state of the alarm unit 2, comprising time in which one working state is changed to another working state, and an identity of a device for implementing a change operation. The main control module 204 is further configured to write the working state data into the storage module 205 when the working state changes.

Further, the working state history data further comprises data related to failure in changing the working state. For example, when the alarm disabling unit 3 which does not match with the alarm unit 2 or is illegitimate tries to operate the alarm unit 2 to change the alarm unit 2 from an alarm enabled state to an alarm disabled state, the unlocking data received by the alarm unit 2, identity data of the alarm disabling unit 3 or the like are also stored as the working state history data. Thus, a security guard may learn an operation history of the anti-theft system according to the stored working state history data, which is convenient to find out a merchandise when the merchandise is lost and is also beneficial to search for and prevent potential attack behaviors for the system.

Further, according to the present disclosure, the alarm disabling unit 3 may be implemented by any storage device which stores data and from which the data can be read, such as a magnetic card, an NFC card or the like. The data management unit 1 may be implemented by any device capable of data processing and data communication, for example, a computer, an intelligent mobile phone or the likes.

A working flow of the system according to the present disclosure will be described below.

(1) Writing Unlocking Judgment Data into the Alarm Unit

In S11, the data management unit 1 establishes a connection with the data communication module 202 of the alarm unit 2;

in S12, it is judged whether the data management unit 1 is a legitimate management unit for the alarm unit 2;

in S13, if it is judged that the data management unit 1 is a legitimate management unit for the alarm unit 2 in step S12, the data management unit 1 retrieve synchronized unlocking judgment data and transmits the unlocking judgment data to the main control unit 204 of the alarm unit 2 through the data communication module 202; otherwise, stops operations and returns error information; and in S14, the main control module 204 of the alarm unit 2 writes the unlocking judgment data from the data communication module 202 into the storage module 205.

(2) Disabling an Alarm Enabled State of the Alarm Unit

In S21, the alarm disabling unit 3 establishes a connection with the data communication module 202 of the alarm unit 2;

in S22, the alarm unit 2 acquires the unlocking data embedded in the alarm disabling unit 3 through the data communication module 202;

in S23, the main control module 204 of the alarm unit 2 judges whether the unlocking data is legitimate according to the unlocking data and the unlocking judgment data stored in the storage module 205 of the alarm unit 2; and in S24, if it is judged that the unlocking data is legitimate in step 23, the main control module 204 sets the working state stored in the working state storage module therein to data representing the alarm enabled state; otherwise, does not perform any operation.

(3) The Data Management Unit Extracting State History Data

The state history data comprises working state history data, merchandise state history data and/or user interaction data, which are stored in the storage module of the alarm unit 2.

In S31, the data management unit 1 establishes a connection with the data communication module 202 of the alarm unit 2;

in S32, it is judged whether the data management unit 1 is a legitimate management unit for the alarm unit 2;

in S33, if it is judged that the data management unit 1 is a legitimate management unit for the alarm unit 2 in S32, the data management unit 1 requests the state history data from the alarm unit 2 through the data communication module 202; otherwise, stops operations and returns error information; and in S34, the main control module 204 of the alarm unit 2 reads the state history data from the storage module 205, and transmits the state history data to the data management unit 1 through the data communication module 202.

Specific embodiments of the present disclosure will be described below with reference to accompanying drawings.

Figure 3:
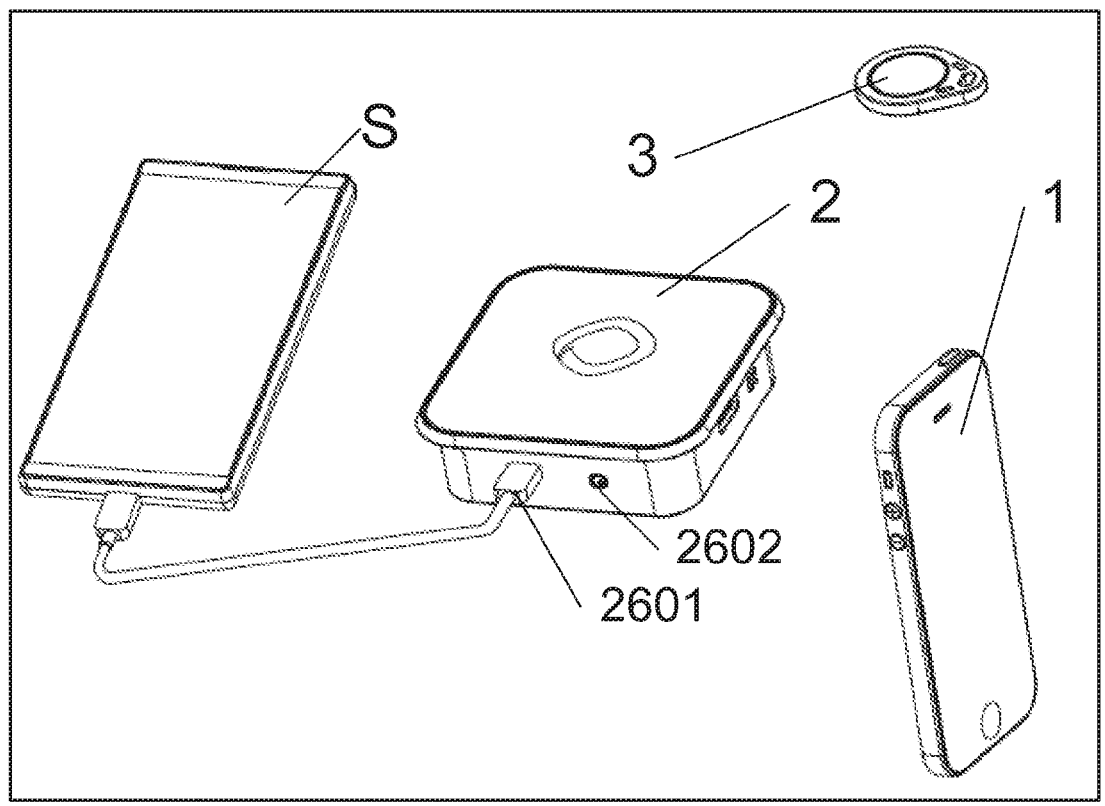
FIG. 3 is a diagram of the exterior of an alarm unit according to an embodiment of the present disclosure.

FIG. 3 is a structural diagram of a data collection anti-theft system according to an embodiment of the present disclosure. The embodiment is a specific embodiment of the systems illustrated in FIGS. 1 and 2. As shown in FIG. 3, in the embodiment, the alarm unit 2 is a protection base for a mobile phone, on which an merchandise to be protected, i.e., a mobile phone 5, may be placed and fixed. The alarm disabling unit 3 is an NFC card. The data management unit 1 is implemented by an intelligent mobile phone having an NFC function. The data management unit 1 communicates with the alarm unit 2 and the alarm disabling unit 3 through the NFC technology respectively.

The protection base 2 for the mobile phone is connected to the mobile phone S via a sensor interface 2061, and is connected to an external power source via a power source interface 2062 to supply power to the entire apparatus. In the embodiment, the sensor module 201 of the alarm unit 2 is implemented by a current state detector, and a group of sensor lines connecting the mobile phone and the protection base for the mobile phone comprises an alarm line for detecting whether the mobile phone is in a normal state (a protected state) and a data line for detecting a usage state of the mobile phone, such as a pick-up state and a put-down state. When the sensor module 201 monitors that an interruption exists in current of the alarm line, the sensor module 201 transmits a current interruption signal (as a state change signal) to the main control module 204. When the main control module 204 receives the current interruption signal which indicates that the mobile phone to be protected is separated from the sensor line, the main control module 204 transmits an alarm signal to the alarm processing module 203.

In the process of disabling the alarm state, an NFC card is connected to the protection base for the mobile phone, and the main control module 204 in the protection base for the mobile phone reads an unlocking code in the NFC card, and compares the read unlocking code with an unlocking code in the storage module 205. When it is judged that the two unlocking codes are the same, the main control module 204 sets working state data in the working state storage module thereof as data representing an "alarm disabled state".

In the process of setting the unlocking data and the unlocking judgment data, the unlocking data and the unlocking judgment data are written by the intelligent mobile phone having an NFC function into the protection base for the mobile phone and the NFC card respectively.

Further, the main control module 204 and the alarm processing module 203 in the protection base 2 for the mobile phone may be implemented by a microprocessor respectively, or may also be implemented by the same processor. For example, both of the main control module 204 and the alarm processing module 203 are implemented by Spreadtrum MSM6000, the storage module 205 is implemented by an NAND flash memory, and the data communication module 202 is implemented by NXP PN532.

Figure 4:
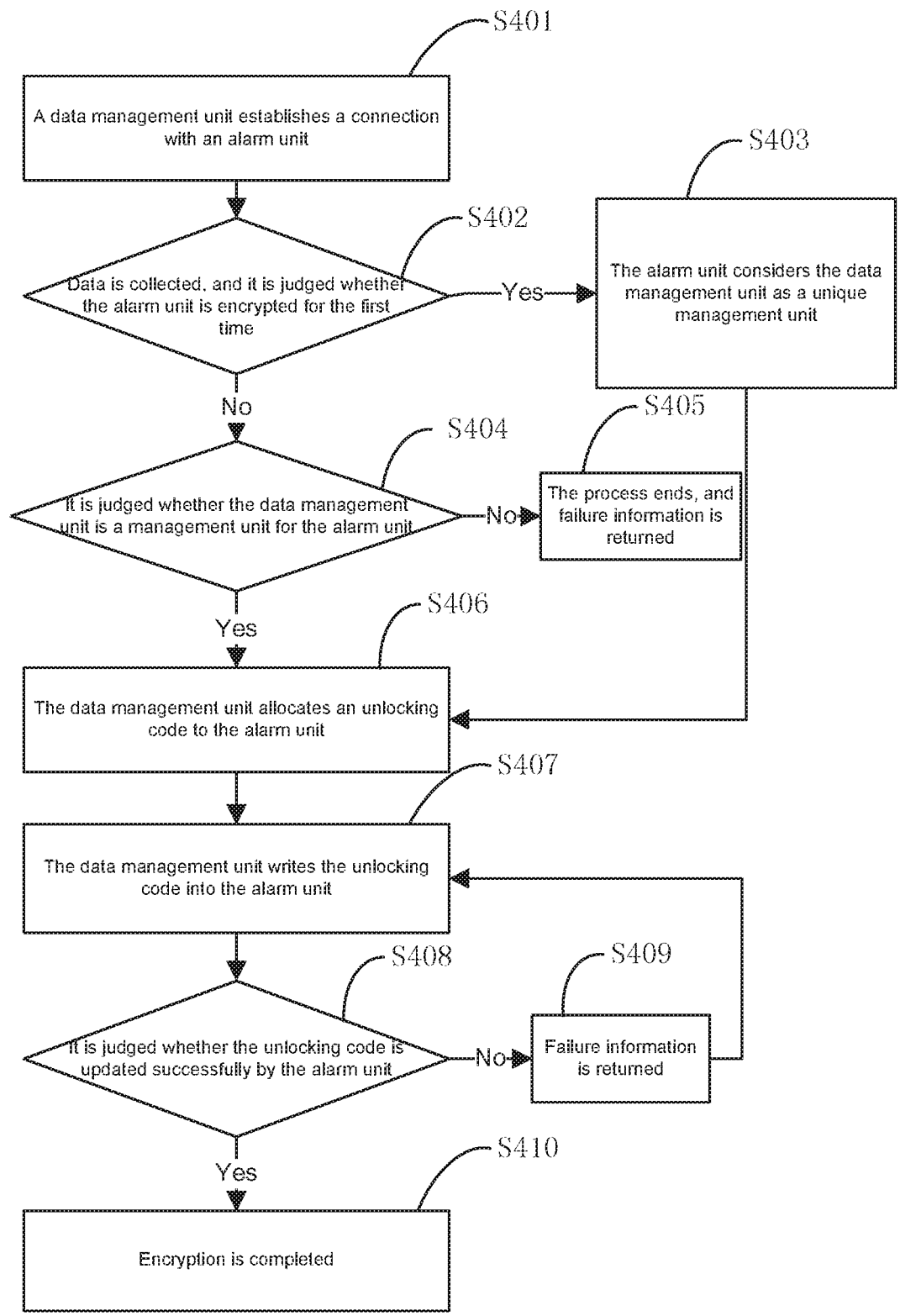
FIG. 4 is a flowchart of encrypting an alarm unit according to an embodiment of the present disclosure.

FIG. 4 is a flowchart of encrypting a single alarm unit according to an embodiment of the present disclosure. The so-called encryption is a process of writing unlocking judgment data into an alarm unit. As shown in FIG. 4, the process comprises the following steps.

In S401, a data management unit is close to the alarm unit, and establishes a connection with the alarm unit according to a wireless communication technology or other NFC technologies.

In S402, the alarm unit judges whether the alarm unit is encrypted for the first time, and if so, the process turns to S403; otherwise, the process turns to S404.

In S403, the alarm unit considers the current data management unit as a unique data management unit thereof.

In S404, the alarm unit judges whether the current data management unit is a legitimate data management unit for the alarm unit, and if so, the process turns to S406; otherwise, the process turns to S405.

In S405, the alarm unit judges that the current data management unit does not have an authority to encrypt the alarm unit, and returns encryption failure information to the current data management unit.

In S406, the data management unit assigns one or more unlocking codes for the alarm unit.

In S407, the data management unit writes the unlocking codes assigned in S406 into the alarm unit.

In S408, the alarm unit judges whether the unlocking codes are updated successfully, and if not, the process turns to S409; otherwise, the process turns to S410.

In S409, the alarm unit returns failure information to the data management unit, and S407 is repeated.

In S410, encryption of the alarm unit is completed.

If the system comprises multiple alarm units, the above flow is repeated for each alarm unit.

Figure 5:
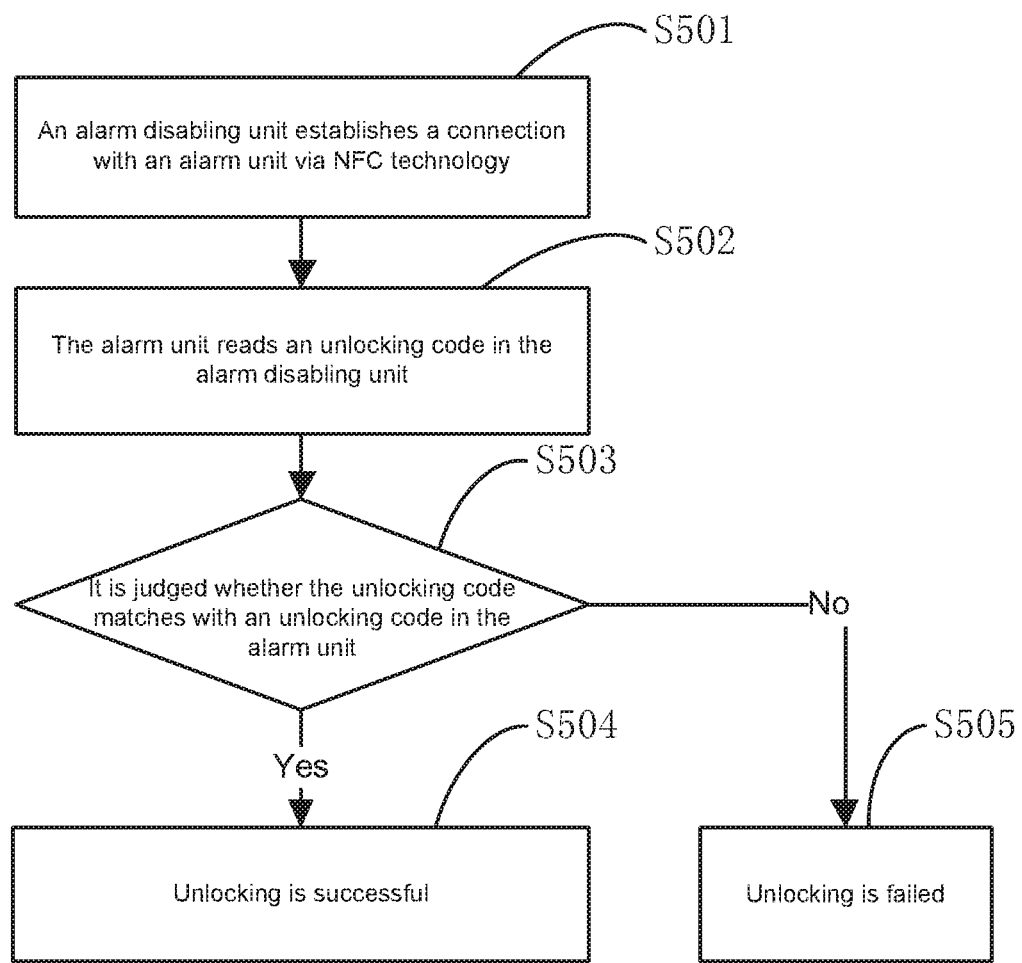
FIG. 5 is a flowchart of decrypting an alarm unit according to an embodiment of the present disclosure.

FIG. 5 is a flowchart of unlocking a single alarm unit according to the above embodiment of the present disclosure. The so-called unlocking is a process of disabling an alarm state. As shown in FIG. 5, the process comprises the following steps.

In S501, an alarm disabling unit is close to the alarm unit, and establishes a connection with the alarm unit according to an NFC technology.

In S502, the alarm unit reads an unlocking code embedded in the alarm disabling unit.

In S503, the alarm unit matches the unlocking code with one or more unlocking codes stored locally, and judges a matching result. If the unlocking code is matched successfully with one of the one or more unlocking codes stored locally, the process turns to S504; otherwise, the process turns to S505.

In S504, the alarm unit is unlocked successfully.

In S505, the alarm unit fails to be unlocked.

Figure 6:
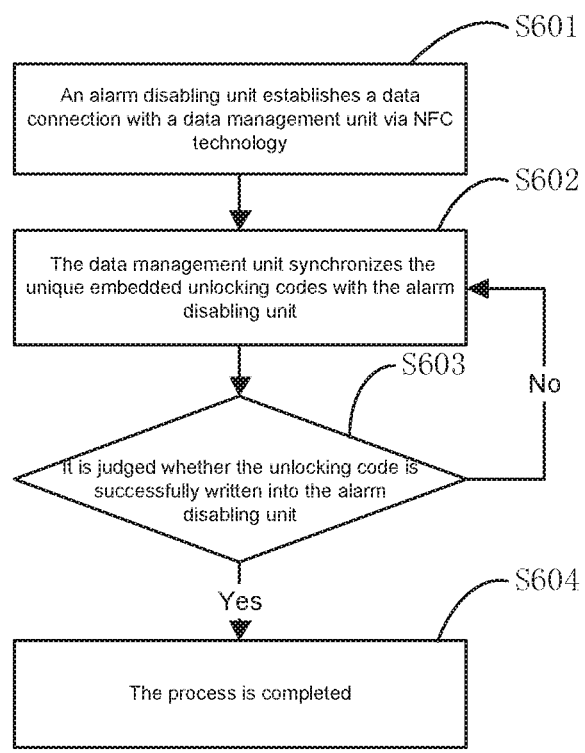
FIG. 6 is a flowchart of synchronizing an unlocking code with an alarm disabling unit according to an embodiment of the present disclosure.

FIG. 6 is a flowchart of synchronizing an unlocking code with a single alarm disabling unit according to an embodiment of the present disclosure. The so-called unlocking code synchronizing is a process of writing unlocking data. As shown in FIG. 6, the process comprises the following steps.

In S601, the alarm disabling unit is close to a data management unit, and establishes a connection with the data management unit according to an NFC technology.

In S602, the data management unit synchronizes a unique unlocking code from the alarm disabling unit, and writes a processing code into the alarm disabling unit.

In S603, the data management unit judges whether the code is synchronized successfully, and if not, the process turns to S602; otherwise, the process turns to S604.

In S604, the data management unit completes synchronizing of the unlocking code.

If the system comprises multiple alarm disabling units, the above flow is repeated.

Figure 7:
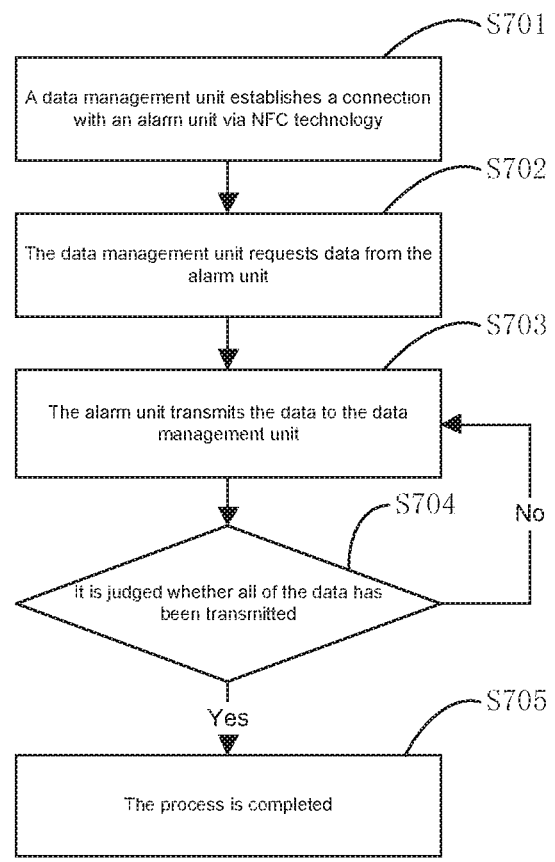
FIG. 7 is a flowchart of extracting data from an alarm unit according to an embodiment of the present disclosure.

FIG. 7 is a flowchart of extracting state history data from a single alarm unit according to an embodiment of the present disclosure. As shown in FIG. 7, the process comprises the following steps.

In S701, a data management unit is close to the alarm unit, and establishes a connection with the alarm unit according to an NFC technology.

In S702, the data management unit requests the state history data from the alarm unit.

In S703, the alarm unit transmits the specified state history data to the data management unit.

In S704, the alarm unit judges whether all of the requested state history data has been transmitted to the data management unit, and if not, S703 is repeated; otherwise, the process turns to S705.

In S705, the data management unit completes extraction of the state history data.

If the system comprises multiple alarm units, the above flow is repeated for each alarm unit.

The above specific embodiments further describe the purpose, technical solutions and beneficial effects of the present disclosure in detail. It should be understood that the above description is merely specific embodiments of the present disclosure, rather than limitations to the present disclosure. Any modification, equivalent substitution, improvement or the like, made within the spirit and principle of the present disclosure, should be included in the protection scope of the present disclosure.

We claim:

1. A merchandise security system, comprising a data management unit for managing a state of a protected merchandise, an alarm unit comprising a sensor module to monitor the state of the merchandise and an alarm disabling unit for disabling an alarm enabled state of the alarm unit, wherein,
the alarm unit further comprises a data communications module that uses near field communications (NFC) and a storage module, and the alarm disabling unit communicates using NFC;
the data management unit synchronizes unlocking data in the alarm disabling unit, via a writing operation using NFC, and sets unlocking judgment data, via a writing operation using NFC, in the storage module;
the alarm unit detects, in the alarm enabled state, whether the protected merchandise is in a normal state, and send out an alarm signal to the data management unit when detecting that the protected merchandise is not in a normal state; and
the alarm unit judges, according to the unlocking judgment data stored therein, whether the unlocking data is legitimate, and disable the alarm enabled state when judging that the unlocking data is legitimate,
wherein the unlocking judgment data corresponds to unique legitimate unlocking data embedded in the alarm disabling unit to ensure that no other alarm disabling unit can disable the alarm enabled state.

2. The system according to claim 1, wherein the alarm unit has one or more unlocking judgment data stored therein, and the alarm disabling unit only has one unlocking data embedded therein; and
when the unlocking data embedded in the alarm disabling unit is legitimate unlocking data for any of the unlocking judgment data in the alarm unit, the alarm disabling unit can disable the alarm enabled state of the alarm unit.

3. The system according to claim 2, wherein the embedded unlocking data is the legitimate unlocking data when the embedded unlocking data matches any of the unlocking judgement data.

4. The system according to claim 2, wherein the unlocking judgment data is encrypted data which is encrypted using a particular encryption algorithm, and the unlocking data is a key for decrypting the encrypted data.

5. The system according to claim 1, wherein the data management unit is further configured to enable the alarm unit from the alarm disabled state to the alarm enabled state.

6. The system according to claim 1, wherein the alarm unit is further configured to acquire and store working state history data, and the data management unit is further configured to read the working state history data from the alarm unit, wherein the working state history data is history information of changes in a working state of the alarm unit.

7. The system according to claim 6, wherein the working state history data comprises time for enabling the alarm enabled state, an identity of the data management unit implementing the enabling operation, time for disabling the alarm enabled state, and an identity of the alarm disabling unit implementing the unlocking operation.

8. The system according to claim 1, wherein the alarm unit is further configured to acquire and store merchandise state history data and/or user interaction data of the merchandise to be protected, and the data management unit is further configured to acquire the merchandise state history data and/or user interaction data of the merchandise to be protected from the alarm unit, wherein the merchandise state history data is information of changes in a state of the merchandise to be protected, and the user interaction data is data of interaction behaviors of a user with the merchandise to be protected and other user Information.

9. The system according to claim 8, wherein the state of the merchandise comprises a "normal state" in which the merchandise is protected and an "abnormal state" in which the merchandise is unprotected as well as other detectable states belonging to the "normal state".

10. The system according to claim 1, wherein the alarm unit further comprises an alarm processing module and a main control module, wherein,
the sensor module is configured to transmits a state change signal to the main control module when it senses that the state of the merchandise to be protected changes;
the main control module is configured to control a working state of the alarm unit, and judges, in the alarm enabled state, whether the merchandise is in an abnormal state according to the state change signal, and transmits an alarm signal to the alarm processing module when it judges that the merchandise to be protected is in an "abnormal state";
the alarm processing module is configured to implement an alarm process when receiving the alarm signal transmitted by the main control module;
the data communication module is configured to establish a data communication channel with the alarm disabling unit or the data management unit, and to receive data transmitted by the alarm disabling unit or the data management unit.

11. The system according to claim 10, wherein
the main control module is further configured to transmit the state change signal to the alarm processing module; and
the alarm processing module is further configured to process the state change signal to generate merchandise state history data and/or user interaction data, and store the generated merchandise state history data and/or user interaction data into the storage module.

12. The system according to claim 11, wherein
the sensor module is further configured to monitor other detectable subdivided states of the merchandise to be protected belonging to the "normal state", and transmits a subdivided state change signal to the main control module when a detected subdivided state belonging to the "normal state" changes;
the main control module is further configured to transmit the subdivided state change signal to the alarm processing unit; and
the alarm processing unit is further configured to process the subdivided state change signal to generate the merchandise state history data and/or user interaction data, and save the generated merchandise state history data and/or user interaction data into the storage module.

13. The system according to claim 10, wherein
the storage module is further configured to save the working state history data, wherein the working state history data is history information of changes in a working state of the alarm unit; and
the main control module is further configured to write the working state data into the storage module when the working state changes.

14. The system according to claim 13, wherein the working state history data further comprises data related to failure in changing the working state.

15. A method for operating a merchandise security system, comprising merchandise security system, comprising a data management unit for managing a state of a protected merchandise, an alarm unit comprising a sensor module to monitor the state of the merchandise and an alarm disabling unit for disabling an alarm enabled state of the alarm unit, wherein,
the alarm unit further comprises a data communications module that uses near field communications (NFC), and the alarm disabling unit communicates using NFC;
the data management unit synchronizes unlocking data in the alarm disabling unit, via a writing operation using NFC, and sets unlocking judgment data in the alarm unit;
the alarm unit detects, in the alarm enabled state, whether the protected merchandise is in a normal state, and send out an alarm signal to the data management unit when detecting that the protected merchandise is not in a normal state; and
wherein the unlocking judgment data corresponds to unique legitimate unlocking data embedded in the alarm disabling unit to ensure that no other alarm disabling unit can disable the alarm enabled state;
the alarm unit further comprises an alarm processing module and a main control module, and a storage module, wherein, the sensor module is configured to transmits a state change signal to the main control module when it senses that the state of the merchandise to be protected changes;
the main control module is configured to control a working state of the alarm unit, and judges, in the alarm enabled state, whether the merchandise is in an abnormal state according to the state change signal, and transmits an alarm signal to the alarm processing module when it judges that the merchandise to be protected is in an "abnormal state";
the alarm processing module is configured to implement an alarm process when receiving the alarm signal transmitted by the main control module;
the data communication module is configured to establish a data communication channel with the alarm disabling unit or the data management unit, and to receive data transmitted by the alarm disabling unit or the data management unit; and
the storage module is configured to store the unlocking judgment data,
the method comprising writing unlocking judgment data in the alarm unit of the system by the steps of:
S11: the data management unit establishing a NFC connection with the data communication module of the alarm unit;
S12: judging whether the data management unit matches with the alarm unit;
S13: if it is judged that the data management unit matches with the alarm unit in step S12, the data management unit retrieving synchronized unlocking judgment data and transmitting the unlocking judgment data to the main control unit of the alarm unit through the data communication module; and if it is judged that the data management unit does not match with the alarm unit in step S12, returning error information; and S14: the main control module of the alarm unit writing the unlocking judgment data from the data communication module in the storage module to.

16. The method for operating a merchandise security system according to claim 15, further comprising disabling the alarm enabled state in the alarm unit of the system by steps of:

S21: the alarm disabling unit establishing a NFC connection with the data communication module of the alarm unit;

S22: the alarm unit acquiring the unlocking data embedded in the alarm disabling unit through the data communication module;

S23: the main control module of the alarm unit judging whether the unlocking data is legitimate according to the unlocking data and the unlocking judgment data stored in the storage module of the alarm unit; and S24: if it is judged that the unlocking data is legitimate in step 23, the main control module setting the working state stored in a working state storage module in the main control module as data representing the alarm enabled state;

otherwise, not performing any operation.

17. The method for operating a merchandise security system according to claim 15, further comprising extracting state history data from the system by the following steps, wherein the state history data comprises working state history data, merchandise state history data and/or user interaction data:

S31: the data management unit establishing a NFC connection with the data communication module of the alarm unit;

S32: judging whether the data management unit is a legitimate management unit for the alarm unit;

S33: if it is judged that the data management unit is a legitimate management unit for the alarm unit in S32, the data management unit requesting the state history data from the alarm unit through the data communication module;

otherwise, stopping operations and returning error information; and

S34: the main control module of the alarm unit reading the state history data from the storage module, and transmitting the state history data to the data management unit through the data communication module.

* * * * *